United States Patent [19]
Adcock, Jr.

[11] Patent Number: 5,950,563
[45] Date of Patent: Sep. 14, 1999

[54] TERRARIUM ENCLOSURE SYSTEM

[76] Inventor: Robert R. Adcock, Jr., 8243 Bluelake Dr., San Diego, Calif. 92117

[21] Appl. No.: 08/994,817

[22] Filed: Dec. 19, 1997

[51] Int. Cl.⁶ .................................................... A01K 63/00
[52] U.S. Cl. ............................................... 119/246; 47/69
[58] Field of Search .................................. 119/246, 247, 119/257, 266, 267; 47/69

[56] References Cited

U.S. PATENT DOCUMENTS

| | | |
|---|---|---|
| D. 267,163 | 12/1982 | Murray . |
| 2,608,797 | 9/1952 | Rawson . |
| 2,814,895 | 12/1957 | Flam ........................................ 119/257 |
| 3,605,335 | 9/1971 | Maitland . |
| 3,908,598 | 9/1975 | Jewson .................................... 119/267 |
| 4,201,153 | 5/1980 | Nace . |
| 4,353,327 | 10/1982 | Shroyer ................................... 119/257 |
| 4,967,694 | 11/1990 | Waldman ................................. 119/246 |
| 4,995,334 | 2/1991 | Wechsler ................................. 119/246 |
| 5,067,438 | 11/1991 | Hoffa . |
| 5,327,855 | 7/1994 | Pritchard et al. ....................... 119/267 |
| 5,404,839 | 4/1995 | Mancuso ................................. 119/246 |
| 5,413,070 | 5/1995 | Dewalt . |
| 5,445,112 | 8/1995 | Grosman ................................. 119/246 |
| 5,451,443 | 9/1995 | Wechsler ..................................... 47/69 |
| 5,713,304 | 2/1998 | De Vosjoli et al. ..................... 119/246 |

FOREIGN PATENT DOCUMENTS 2256119  2/1992  United Kingdom .

*Primary Examiner*—Robert P. Swiatek
*Assistant Examiner*—Elizabeth Shaw
*Attorney, Agent, or Firm*—Frank D. Gilliam

[57] ABSTRACT

The present invention provides a multiple oriented two piece terrarium enclosure system which utilizes a base member for engagement with a shell structure having a slanted frontal viewing surface for improved viewing capabilities. The present invention also provides unique lateral access to the interior of the terrarium. Specifically, the shell structure has a cutout portion for providing a fully enclosed system when the shell structure is positioned in a first orientation, and alternatively providing a means for accessing the interior of the terrarium when the shell structure is positioned in a second orientation. This dual orientation capability allows improved access for feeding and cleaning the terrarium with minimal disturbance to the habitat or its inhabitants. The shell structure utilizes a securing mechanism for maintaining positioning of the shell structure with respect to the base while in either a first orientation or a second orientation. The natural environment within the interior of the terrarium is controlled and maintained by a combination of lamp assembly integral the base member and one or more pre-selected apertures formed in the shell structure.

17 Claims, 3 Drawing Sheets

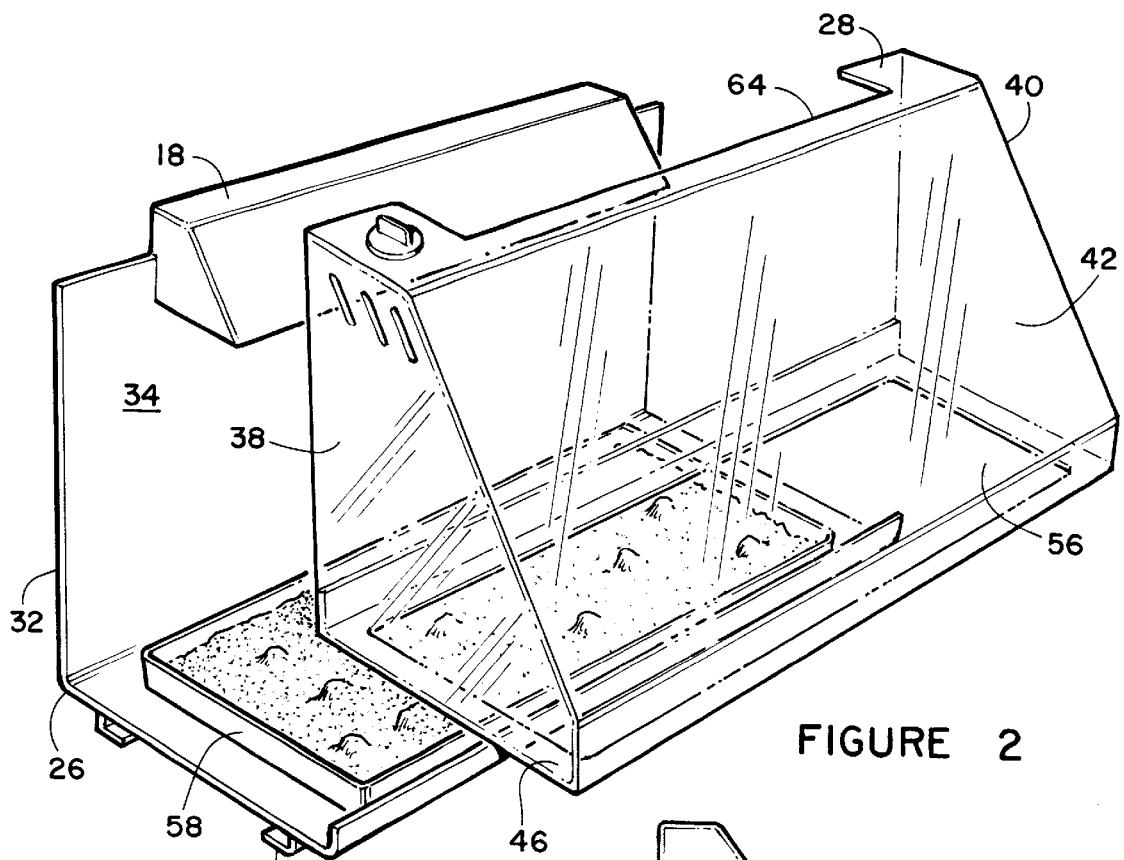
FIGURE 2
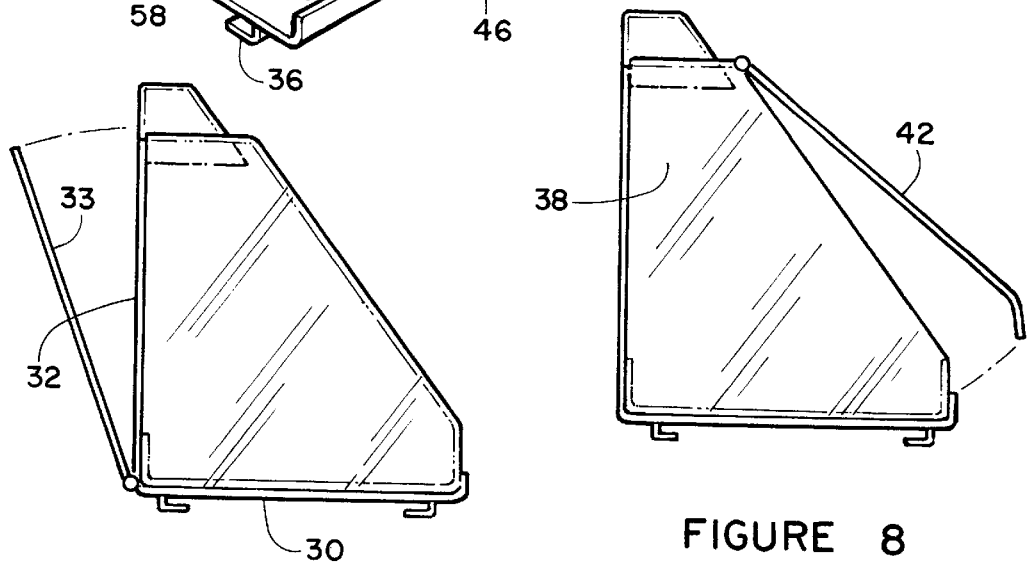
FIGURE 7
FIGURE 8

TERRARIUM ENCLOSURE SYSTEM

FIELD OF THE INVENTION

The present invention pertains generally to terrarium enclosure systems. More particularly, the present invention relates to a terrarium enclosure system which may be selectively oriented with respect to a base member for providing either a fully enclosed system or a partially enclosed system having a laterally accessible interior. The present invention is constructed with a slanted frontal viewing surface for enhanced viewing capabilities during use.

BACKGROUND OF THE INVENTION

A variety of enclosure systems, also known as terrariums, have been developed for keeping or raising and observing animals or plants. Typically, these enclosure systems have a common rectangular shape and are wholly or predominantly enclosed in a glass type container. In many circumstances, the prior art rectangular enclosure is open at the top for providing a singular point of entry to the interior of the enclosure. Often, a mesh screen or lid having an illumination device is positioned over the top of the rectangular enclosure to fully enclose the system.

Such prior art enclosures are not only bulky and heavy due to their unnecessary weight and arrangement of components, but they exhibit extremely poor viewing characteristics during observation of animals or plants having a relatively small size. This is due in part because the observer is unable to view the inhabitants of the enclosure in their natural state by looking downward from above, which is common and indeed necessary in many situations.

The obtrusive top of the prior art enclosure not only adds to the problem set forth above, but makes accessing the interior of the container for any purpose both difficult and burdensome as the user must blindly reach downward into the container without adequate visual ability. This is not only dangerous depending on the natural characteristics of the inhabitant, but it is intrusive and disturbing to the inhabitant and disruptive to the natural habitat.

The prior art enclosure have a further disadvantage in that they do not provide or maintain a controlled natural warm ambient air temperature through the interior as is required for many reptile or plant inhabitants, and instead, allow the air to readily enter and escape through the opened top.

Finally, another problem that plagues users of terrarium enclosure systems is the numerous components which must be purchased and assembled in order to provide a desired natural environment for an inhabitant. This hodgepodge of components is often unsatisfactory leading to complication and high cost. In their frustration, many users simply resort to an aquarium type container which, although useful for their intended purposes, present many serious disadvantages when applied to a terrarium enclosure system as set forth above.

SUMMARY OF THE INVENTION

It is therefore the primary object of the present invention to provide a terrarium enclosure system having improved viewing capabilities when observing downward from above.

It is also an object of the present invention to provide a terrarium enclosure system which has a means for accessing the interior of the system with is less intrusive to the inhabitant and less disruptive to its natural habitat.

It is another object of the present invention to provide a terrarium enclosure system which is easy to assemble and use.

It is yet another object of the present invention to provide a terrarium enclosure system which simulates the natural temperature environment of its inhabitants and which is maintained and controlled.

It is another object of the present invention to provide a terrarium enclosure system which is entertaining to the user.

It is another object of the present invention to provide a terrarium enclosure system which is safe to use, lightweight, and inexpensive to manufacture.

These and other objects are achieved in accordance with the present invention by providing a two piece terrarium enclosure system which utilizes an integrated base member for engagement with a movable shell structure having a slanted frontal viewing surface for improved viewing into the interior of the terrarium. The base member is a one piece integrated structure having a bottom surface, a back panel substantially perpendicular to the back surface, and a lamp assembly for providing both a heat and light source.

The present invention implements unique lateral access to the interior of the terrarium by selected movement, arrangement or orientation of a shell structure with respect to a base member, thereby reducing intrusion to inhabitants and disruption to their natural habitat. More specifically, the shell structure has a cutout portion for providing a fully enclosed system when the shell structure is arranged a first orientation, and alternatively providing a lateral means for accessing the interior of the terrarium when the shell structure is arranged in a second orientation. This dual orientation capability allows for improved access for feeding and cleaning the terrarium with minimal disturbance and disruption to the habitat on its inhabitants.

The present invention maintains the shell structure in a secured position with respect to the base member while the shell structure is in either the first or second orientation by implementing a lip extending laterally along the edge of the base member and abutting the shell structure. An additional securing mechanism may be provided while the shell structure is in the first orientation by forming a notch in the shell structure for abutment with the lamp assembly. As such, the shell structure is stayed from lateral slidable movement of the shell structure with respect to base member.

Finally, the natural temperature environment within the interior of the terrarium is maintained and controlled by the combination of the lamp assembly and multiple preselected air apertures formed in the shell structure surface.

Further detail regarding the terrarium enclosure system in accordance with the present invention may be had with reference to the detailed description which is provided below, taken in conjunction with the following illustrations.

BRIEF DESCRIPTION OF THE DRAWINGS

FIG. 2 is a perspective view of the present invention showing the shell structure removed from the base member;

FIG. 3 is a side elevational view of the present invention in a first orientation for normal observation and display;

FIG. 4 is a front elevational view of the present invention a first orientation for normal observation and display;

FIG. 5 is a side elevational view of the present invention in a second orientation for readily accessing the interior of the terrarium enclosure;

FIG. 7 is a side elevational view of present invention illustrating a hinged back panel of the base member;

FIG. 8 is a side elevational view of the present invention illustrating a hinged portion of the frontal viewing surface for providing an alternative means for accessing the interior of said terrarium enclosure;

DETAILED DESCRIPTION OF THE PREFERRED EMBODIMENT

Figure 1:
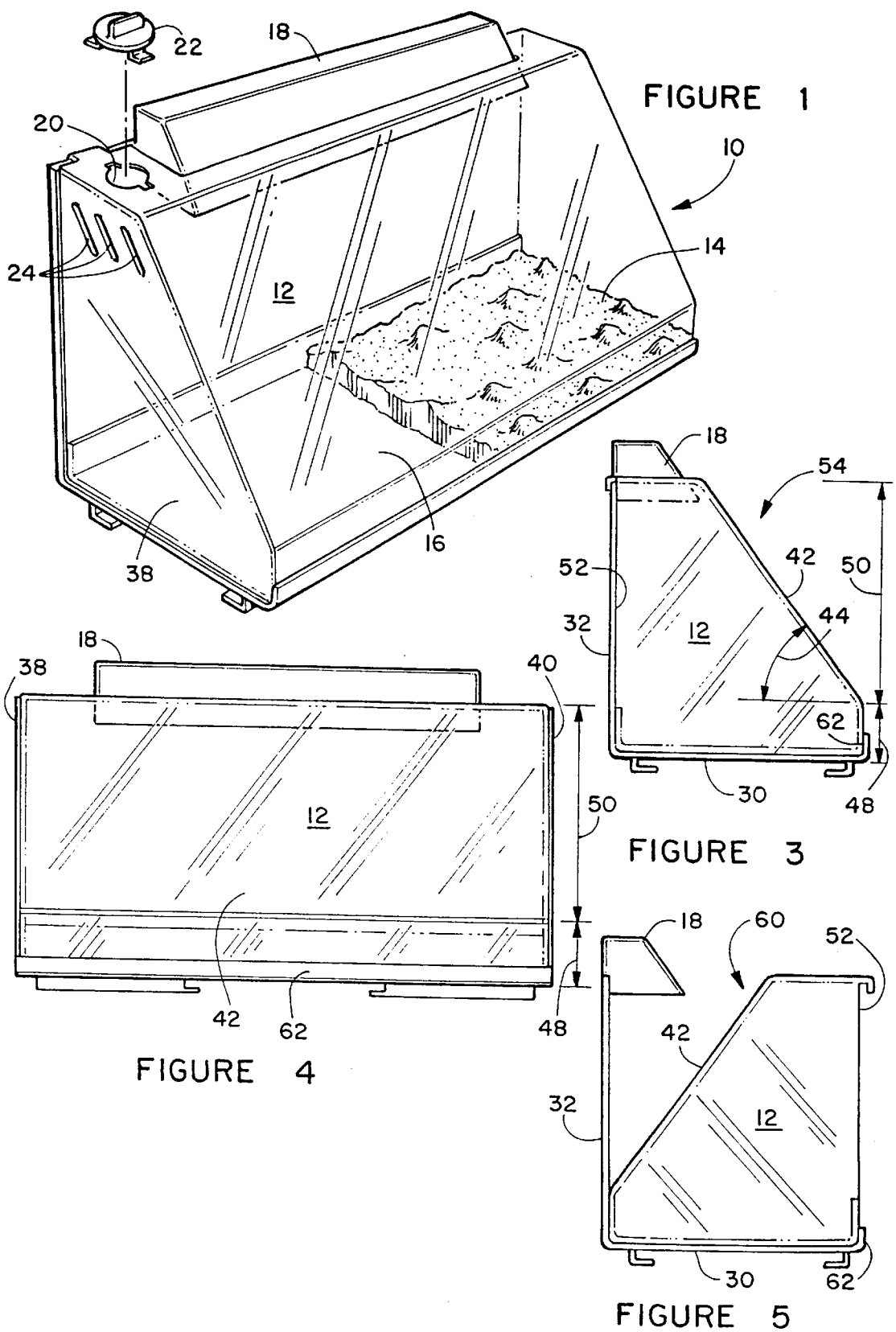
FIG. 1 is an overall perspective view of the present invention arranged in a first orientation for normal observation and display.

Initially referring to FIG. 1, a terrarium enclosure system 10 of the present invention is provided for keeping or raising and observing animals and plants, including but not limited to terrestrial, amphibious, or arboreal animals or plants.

In accordance with one aspect of the present invention, a terrarium enclosure system 10 is shown in a fully enclosed or first orientation for use during normal observation and display. As is evident, an interior 12 is provided for displaying material 14 which may be placed therein for providing a desired environment or habitat for the animal or plant. For example, it is contemplated that the display material 14 may be a variety of related accessories including but not limited to natural or artificial substrates, plants, and decorative or entertaining items.

In keeping with one of the principle objects of the invention, the terrarium enclosure system 10 is constructed with a slanted surface 16 to allow improved visual observation and display of the interior 12. Further, the terrarium 10 of the present invention has a lamp assembly 18 positioned at or near the top of the terrarium 10 for providing the entry of warm temperature ambient air to the interior 12 as well as provide an illumination source for highlighting the background, creating a mood, or visually enhancing the appearance of the inhabitant.

It is to be noted that a feeding aperture 20 for receiving a plug 22 may be provided at or near the top of the terrarium 10 for supplying food and other items to the inhabitants of the present invention.

The present invention also provides a mechanism for stabilizing the ambient air temperature in the interior 12 of the terrarium 10. In the preferred embodiment, the stabilizing mechanism includes the combination of a lamp assembly 18 for providing the source of warm ambient air temperature, and a pre-selected number or sizes of air apertures 24 for maintaining and controlling breathability and temperature control of the terrarium 10. It is to be understood that apertures 24 may be selectively placed in a variety of locations about the terrarium 10.

The assembly of two main components of the present invention is best illustrated by referring to FIG. 2. More particularly, a shell structure 28 is shown as being disengaged or removed from base member 26. It is evident that shell structure 28 is engagable with the base member 26 to create a fully enclosed interior 12 of the terrarium 10.

The base member 26 of the present invention is constructed with a bottom surface 30 and a back panel 32. The base member 26 is preferably formed from a lightweight material, such as molded acrylic plastic, although other materials well known in the art may be used to satisfy the intended purposes.

In the preferred embodiment, the back panel 32 is substantially perpendicular to the bottom surface 30 during normal use, although other orientations are within the scope of the present invention. Incidentally, it is to be appreciated that the back panel 32 may have one or more graphic images 34 printed thereon for entertainment or environmental purposes.

Upon closer inspection of the terrarium 10 in FIG. 2, it can be seen that the lamp assembly 18 is secured to the upper portion of the back panel 32. It is to be noted that the lamp assembly 18 may be either integrated with or mounted on base member 26, and may be fixedly or movably secured to the back panel 32 as desired. For instance, the lamp assembly 18 may be detached from the base member 26, or may be movable from its normal position by using a hinge mechanism (not shown). In accordance with the preferred embodiment, the lamp assembly housing 18 is integrally formed from the same molded plastic as is used for the other base member 26 components. Finally, the base member 26 may have base supports or legs 36 for ease of handling during removal and/or transport.

The shell structure 28 of the present invention includes a first side wall 38, a second side wall 40 which is positioned opposite the first side wall 38, and a frontal viewing surface 42 extending laterally between the first side wall 38 and the second side wall 40, and upwardly from the bottom surface 30 of the base member 26 to a height substantially equal to the height of the back panel 32. At least a portion 16 of the frontal viewing surface 42 is slanted at an angle with respect to the bottom surface 30.

The present invention contemplates a shell structure 28 which has a solid bottom or floor surface 46, as well as a shell structure 28 which is entirely devoid of a floor surface. In accordance with the preferred embodiment shown, the shell structure 28 includes a floor panel 46 which abuts or is adjacent the bottom surface 30 of said base member 26 when the shell structure 28 is in a first orientation 54. The floor panel 46 may have a portion cutaway 56 as shown in FIG. 2 and described in more detail below.

The shell structure 28 is preferably formed from a lightweight transparent material, such as a contiguous sheet of acrylic plastic, although other materials well known in the art may be used to satisfy the intended purposes.

Now referring to FIGS. 3–5, the present invention anticipates a portion 48 of the frontal viewing surface 42 as being substantially perpendicular to the bottom surface 30 of the base member 26, and the remaining portion 50 being slanted at an angle of between 20 and 90 degrees from the junction with the perpendicular portion 48 to its point of greatest height. The present invention contemplates the slanted portion 50 extending longitudinally along the entire length of the viewing surface 42 from its lowermost point to a point which is substantially equal to the height of the back panel 32. Furthermore, the point on the slanted portion 50 where it is substantially equal in height to that of the back panel 32 may be either configured so as to abut the back panel 32 and/or the lamp assembly 18, or to be in a spaced relationship with the upper portion of the back panel 32 and the lamp assembly 18. In any event, the viewing surface 42 is extended so as to provide an enclosed interior 12.

The shell structure 28 has at least one cutout portion 52, best illustrated by viewing FIG. 3. The cutout portion 52 is preferably located at the rear or side opposite the viewing surface 42 of the shell structure 28, and although not shown, may extend contiguously to eliminate the necessity of floor panel 46 or to eliminate any surface of the shell structure 28 which is abutting or adjacent the base member 26, when the shell structure 28 is engaged in a first orientation 54 as shown in FIGS. 1 and 3.

It is contemplated by the present invention that there may be a separate and distinct cutout portion 56 as best illustrated in FIG. 2. As shown, a separate cutout portion 56 is provided in the floor panel 46 for proper placement and positioning of the shell structure 28 around a utility tray 58. As such, the contents of the display material 14 may remain uninterrupted during removal or other movement of the shell structure 28 with respect to the base member 26.

As stated, the shell structure 28 is movable on the base member 26 to create an enclosed interior 12 of the terrarium 10. FIG. 5 clearly illustrates the shell structure 28 rotated or positioned in a second orientation 60 wherein the cutout portion 52 is in spaced relationship with the back panel 26 so as to form an opening for easy access to the interior 12 of the terrarium enclosure system 10.

In carrying out the dual orientation aspect of present invention, a securing mechanism is formed in the base member 26 for maintaining the shell structure 28 in a secured position with respect to the base member 26 while the shell structure 28 is in either the first orientation 54 or in a second orientation 60. As shown in the representative FIGS. 3–5, the securing mechanism comprises a lip 62 integral the base member 26 and extending laterally along the edge of the base member 26 for preventing movement of the shell structure 28 in a forward-back direction with respect to the front of the base member 26.

Referring back to FIG. 2, a second mechanism for securing the shell structure 28 to the base member 26 during use in a first orientation 54 includes a notch 64 formed therein for abutment with said lamp assembly 18, thereby staying movement of said shell structure 28 in a lateral direction with respect to the base member 26. As shown in FIG. 1, a hook or latch, preferably formed in the shell structure 28, is engagable with the top of the back panel 32 to secure the top of the shell structure 28 to the base member 28.

Figure 6:
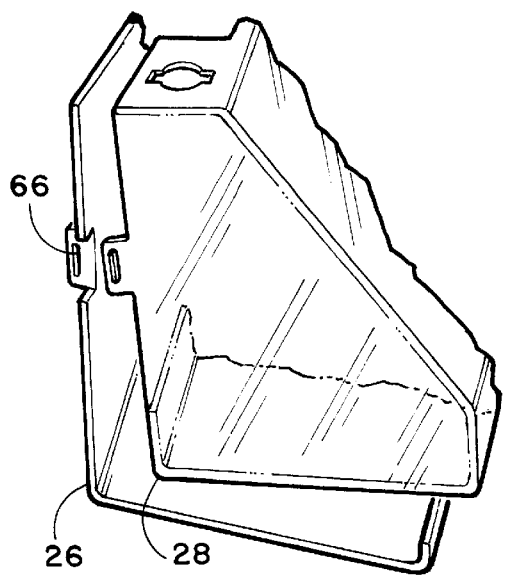
FIG. 6 is a partial perspective view of the present invention illustrating an alternative mechanism for securing the shell structure to the base during normal observation and display.

An alternate embodiment of the securing mechanism for securing the shell structure 28 to the base member 26 during use in a first orientation 54, as shown in FIG. 6, includes a locking device 66 for mating the back panel 32 with either or both of the side walls 38, 40, respectively.

The present invention contemplates a variety of other means for accessing the interior 12 of the terrarium 10 as desired. For example, in an alternate embodiment as shown in FIG. 7, the back panel 32 has a door 33 which is movable relative to the back panel 32. In another embodiment as shown in FIG. 8, all or a portion of the frontal viewing surface 42 is movable with respect to the first and second side walls 38, 40.

Figure 9:
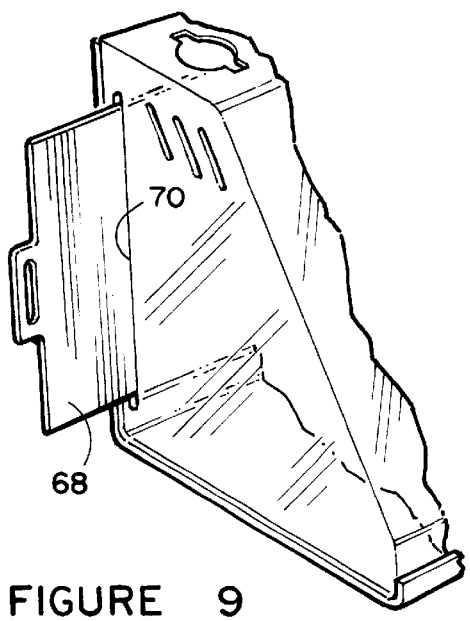
FIG. 9 is a partial perspective view of the present invention illustrating the use of a wall sheet for slidable movement within a slot formed in the shell structure thereby providing a system which remains fully enclosed during removal of the shell structure from the base member.

Referring now to FIG. 9, the use of a temporary panel 68 for insertion into a slot 70, formed in either side wall 38, 40 of said shell structure 28, is shown. The implementation of panel 68 is particularly useful during removal and/or transport of the shell structure 28 where the inhabitants are considered dangerous.

Figure 11:
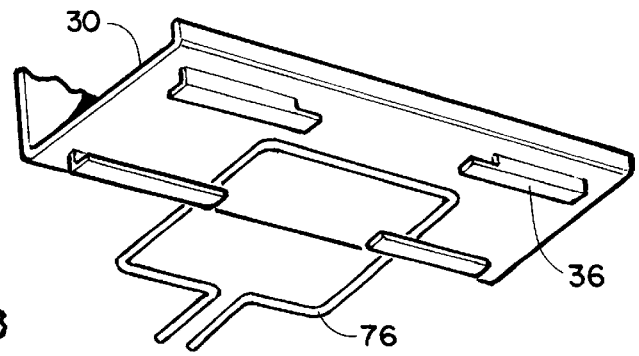
FIG. 11 is a bottom perspective view of the present invention illustrating the assembly of a support bracket to the base support legs of the base member for further mounting to a display tree.
Figure 10:
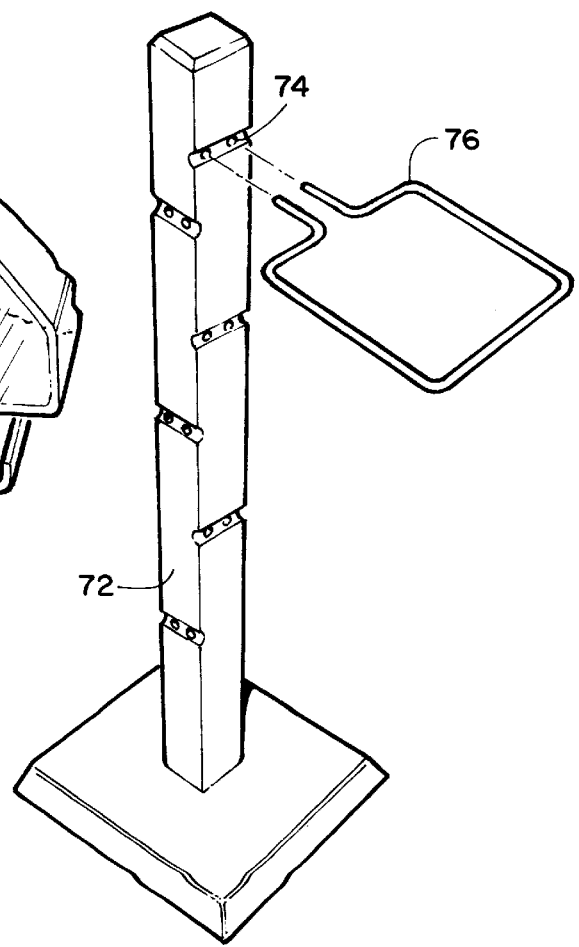
FIG. 10 is a broader perspective view illustrating a support bracket for supporting multiple terrarium enclosure systems, and its assembly with a display tree.

Finally, FIG. 10 is a perspective view of the present invention illustrating the assembly of a display tree 72 for supporting one or more terrariums 10. The display tree 72 has respective grooves 74 for receiving one or more support brackets 76. FIG. 11 is a bottom perspective view of the present invention illustrating the assembly of a support bracket 76 to a shell structure 28 for further mounting on a display tree 72.

It will therefore be understood that various changes in the details, materials and arrangement of parts which have been herein described and illustrated in order to explain the nature of the invention may be made by those skilled in the art within the principal and scope of the invention as expressed in the following claims.

I claim:

1. A terrarium enclosure system, comprising;

a base member having an integral bottom surface and a back panel;

a shell structure having an integral slanted front surface, side walls, top surface, bottom surface and a cutout portion opposite from said slanted front surface, said shell structure engage able with said base member to create an enclosed interior of the terrarium; and means for maintaining said shell structure in a secured position with said base member forming a double bottom structure.

2. An apparatus as recited in claim 1, further comprising a lamp assembly attached to an upper portion of said back panel.

3. An apparatus as recited in claim 2, wherein said securing means comprises a shell structure having a notch formed therein for abutment with said lamp assembly.

4. An apparatus as recited in claim 1, further comprising a means for stabilizing the ambient temperature in said interior of the terrarium.

5. An apparatus as recited in claim 4, wherein said stabilizing means comprises a lamp assembly for providing a warm ambient air temperature in said interior, and a preselected series of apertures formed in said shell structure.

6. An apparatus as recited in claim 1, wherein said back panel has a graphic image printed thereon.

7. An apparatus as recited in claim 6, further comprising a lamp assembly for illuminating said image.

8. An apparatus as recited in claim 1, wherein each one of said shell structures is a single piece of transparent plastic.

9. An apparatus as recited in claim 1, wherein said shell structure comprises:

said front surface extends laterally between said sidewalls, and upwardly from said bottom surface of said base member to a height substantially equal to the height of said back panel, said front surface having at least a portion thereof slanted at an angle with respect to said bottom surface.

10. An apparatus as recited in claim 9, wherein said shell structure further comprises a solid floor panel abutting said bottom surface of said base member.

11. An apparatus as recited in claim 9, wherein said shell structure further comprises a floor panel having a cutout portion abutting said bottom surface of said base member.

12. An apparatus as recited in claim 9, wherein a portion of said front surface is rotatable with respect to said top surface.

13. An apparatus as recited in claim 1, wherein said securing means is a lip extending laterally along the edge of said base member for preventing movement of said shell structure with respect to said base member.

14. An apparatus as recited in claim 1, wherein said base is formed from plastic.

15. A terrarium enclosure system, comprising:

a base member having an integral bottom surface and a back panel;

a shell structure having an integral one piece comprising a slanted front surface, top surface, side walls, bottom surface and a back cutout portion opposite from said slanted front, said shell structure arrange able on said base member to a first and second orientation, said first orientation providing a shell structure wherein said back cutout potion is positioned adjacent said back panel to create an enclosed interior of said terrarium, and said second orientation providing a shell structure orientation wherein said back portion has a spaced relationship with said back panel to form an opening for easy access to said to said interior of said terrarium; and means for maintaining said shell structure in a secured position with respect to said base member while said shell structure is in said first orientation and said second orientation.

16. An apparatus as recited in claim 15, wherein said back panel is substantially perpendicular to said bottom surface.

17. An apparatus as recited in claim 15, wherein said securing means is a lip extending laterally along the edge of said base member for preventing movement of said shell structure with respect to said base member.

\* \* \* \* \*